United States Patent [19]

Nothnagel et al.

[11] 4,397,035

[45] Aug. 2, 1983

[54] DEVICE AND HOUSING FOR RADIO TRANSMISSION RECEPTION

[75] Inventors: Gerd Nothnagel; Albert Wiedemann, both of Munich; Heiner Thomfohrde, Hohenschaeftlarn, all of Fed. Rep. of Germany

[73] Assignee: Siemens Aktiengesellschaft, Berlin & Munich, Fed. Rep. of Germany

[21] Appl. No.: 290,478

[22] Filed: Aug. 6, 1981

[30] Foreign Application Priority Data

Aug. 8, 1980 [DE] Fed. Rep. of Germany ....... 3030102

[51] Int. Cl.³ .............................................. H04B 1/38
[52] U.S. Cl. .................................... 455/90; 455/81; 343/872
[58] Field of Search ................ 455/90, 128, 89, 347, 455/348, 349, 81; 361/422–424; 343/872

[56] References Cited

U.S. PATENT DOCUMENTS

| 3,553,585 | 1/1971 | Robertson et al. | 455/90 |
| 3,622,884 | 11/1971 | Kent | 455/90 |
| 4,259,743 | 3/1981 | Kaneko et al. | 455/81 |

FOREIGN PATENT DOCUMENTS 557812 6/1957 Belgium .............................. 455/90

Primary Examiner—Jin F. Ng
Attorney, Agent, or Firm—Hill, Van Santen, Steadman, Chiara & Simpson

[57] ABSTRACT

A housing for a radio transmission receiver for very high frequencies, specifically for the 30 GHz range. The housing contains alignable antennas for dual directions. The housing is water-tight and contains a complete transmitter-receiver so that only modulation signals and a feed voltage are supplied from the outside. A compact and electrically efficient internal format, particularly of the radio frequency unit, is a principle feature of the invention.

9 Claims, 8 Drawing Figures

DEVICE AND HOUSING FOR RADIO TRANSMISSION RECEPTION

BACKGROUND OF THE INVENTION

The invention relates to a device and housing for a radio transmission receiver in electrical communications technology. The housing utilizes two parts connected to one another via a tight flange.

Such a known transmission-reception device of a relay station or, respectively, mobile station is shown in block diagram in FIG. 8 within the box surrounded by broken lines. The transmission-reception device exhibits a modulation input I which is connected to the transmission branch, and a modulation output II which is connected to the reception branch. The supply of modulation to the relay station or, respectively, mobile station, and the tapping of the received demodulated signal ensues via signal cables (modulation cables) connected thereto. The transmission branch contains a microwave oscillator MO and a stabilization circuit ST for the purpose of oscillator stabilization. The reception branch contains a microwave mixer MM (reception mixer) and an amplifier and demodulator VD in which the intermediate frequency arising in the microwave mixer MM is processed. The transmission branch and the reception branch are interconnected via a circulator Z such that the transmission branch is connected to one arm of the circulator Z and the reception branch is connected to the second arm following in the conducting direction. The arm of the circulator Z lying between these two is connected to a 3 dB divider or splitter TE to which two horn radiator antennas HI, HII offset by 180° in their radiation directions are connected.

The signal generated in the microwave oscillator arrives in equal parts via the coupling path of the circulator Z and via the 3 dB splitter TE at the two horn radiator antennas and is emitted in two directions offset by 180°. The microwave signals received in the reception mode from the horn radiator antennas are in turn brought together in the 3 dB splitter and arrive at the microwave mixer MM via the second coupling path of the circulator Z.

A signal of the microwave oscillator MO of the transmission branch reduced by the decoupling attenuation of the circulator arrives via the decoupled branch of the circulator Z (indicated with a broken-line arrow in the Figure) at the microwave mixer MM of the reception branch and, as a local oscillator signal, here converts the received microwave signal into an intermediate frequency signal of low frequency. After appropriate processing, for example in a FSK demodulator (FSK = frequency shift keying), this signal is converted into digital signals which are conducted via the modulation cable to the main station.

Housings are fundamentally known which exhibit this structure but which, however, for reasons of electrical shielding, consist, for example, entirely of metal parts.

SUMMARY OF THE INVENTION

An object of the invention is to specify a housing with an internal installation in which it is possible to accommodate a complete transmission receiver for very high frequencies of, for example, in the range of 30 GHz together with the transmission reception antennas, all in a water-tight manner. The arrangement is to be designed in such manner that as loss-free as possible an energy transmission can occur, despite the fact that easy accessibility to the inside of the housing is possible such as for alignment of the antennas on the inside. It is a further object to design the internal layout of the station in an electrically and mechanically favorable manner.

The first object is inventively achieved by providing the housing of two oval half shells of which the upper, designed as a cover, is comprised of synthetic, whereas the bottom shell is comprised of a metal injection molding. The upper shell is connected in water-tight fashion to the bottom shell via an inserted shell. Hinged plates connected to one another via a hinge are provided in the housing, the lower one of which carries a plug-in unit connectible to a socket board in the lower half shell which is in turn connected to an external connection with a water-tight outlet in the lower half shell. An upper plate carries oppositely disposed radio frequency antennas on its upper side disposed in the direction of the primary axis. The antennas are comprised of a rigidly disposed waveguide radiator and of a rotatably secured lens for beam adjustment which is electrically effective and disposed in front of the waveguide radiator. The two waveguide radiators are likewise rigidly connected to the transmitter and receiver disposed on the upper chassis part via balance elements, phase correctors, directional couplers, and phasing lines in waveguide technology.

DESCRIPTION OF THE PREFERRED EMBODIMENTS

Figure 1:
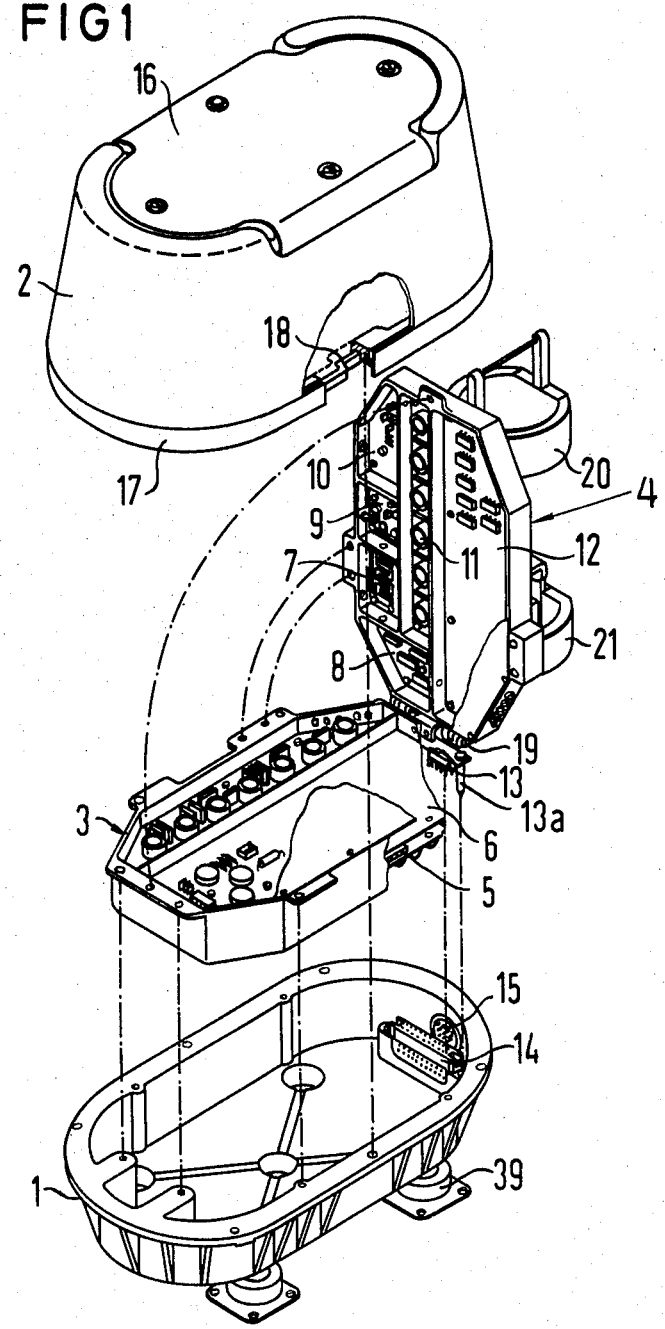
FIG. 1 is an exploded perspective view showing the overall system of the invention.

As illustrated in FIG. 1, transmission and receiver components, including the antennas 20, 21 and a part of the power supply 5, are mutually housed as an inserted chassis in a weather-proof housing. They are disposed in such manner that after removal of the synthetic cover 2, the inserted two section chassis (parts 3, 4) can be removed from the lower part 1 of the housing. The inserted chassis is contacted to the lower part 1 of the housing via a pin and spring strip plug type connection comprising first and second plug members 13, 14 by means of two guidance pins 13a such that it is connected to the signal cable (not illustrated) via the aforementioned plug-type connection 13, 14 and a weatherproof plug 15.

The housing thus is comprised of two half-shell shaped parts 1, 2 of which the upper is designed as a synthetic cover 2. This oval, weatherproof cover 2 contains a recessed sun screen 16 so that a streamlined synthetic radome is provided. The seal 18 between the upper and lower housing shell 1, 2 is inserted in an integral groove of an aluminum ring 17 which is bonded to the cover or radome 2. It is a single-lipped continuous rubber ring whose lip, when built into the radome 2, presses against a flange at the lower half shell 1 on the one hand and at the same time can absorb increased forces so as to prevent water penetration. A circumferential edge of a cast on aluminum ring 17 covers the flange at the lower half shell 2 and protects against direct water impact. The front sides of the radome have an inclination of 10° so that the reflection factor of the transmission power will not further increase.

The two section chassis is comprised of a lower chassis part 3 and of an upper chassis part 4 of aluminum die cast. The two parts are connected to one another via hinge 19 and, after the fastening screws are released, can be tilted by an angle >90°. Thus, the printed board components such as power supply 5, demodulator 6, synthesizer 12, preliminary filter 11, IF preamplifier 10, a 240 MHz gain controlling amplifier 9, multiplier 7, and a 460 MHz oscillator 8 are secured in the upper and lower parts 3, 4 of the insert chassis, and are easily accessible after the removal of protective covers (not illustrated).

The lower part 3 of the inserted chassis is provided in plate-shaped fashion as a tub with a frame toward the top and the bottom so as to form a double trough (oppositely facing troughs) in such manner that two identical circuit boards, power supply 5 and demodulator 6 have space within the respective opposite facing trough, separated by the plate. By means of bores in the plate or via passages at the edge of the plate, electrical connections between the power supply 5 and demodulator 6 can be produced in the shortest way.

Figure 2:
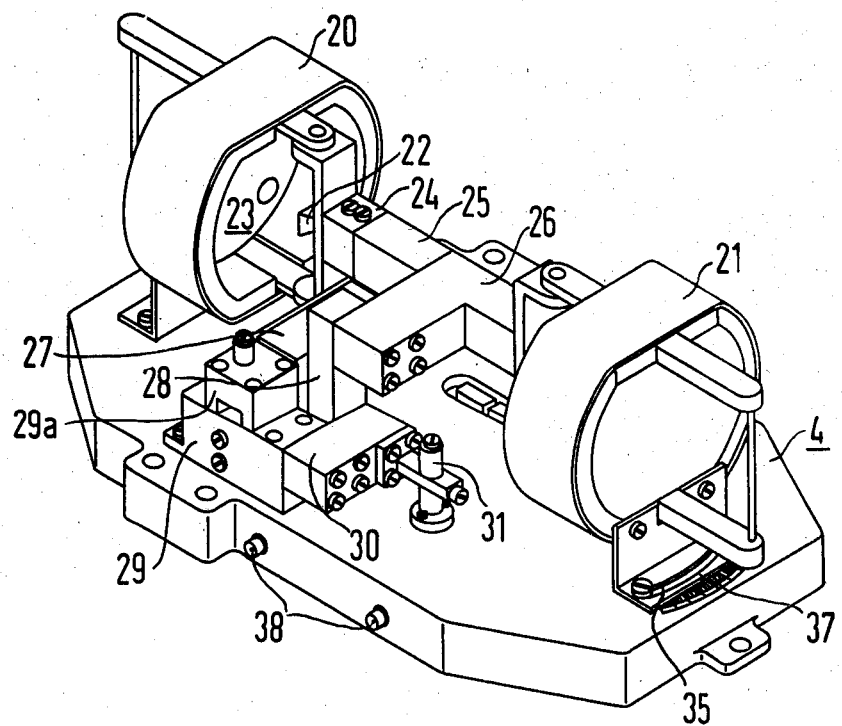
FIG. 2 shows in perspective a part of the system which contains antennas and radio frequency elements for transmitting and receiving.

Referring now to FIG. 2, the upper part 4 of the insert chassis is likewise designed in compartment-like or trough-like fashion toward the bottom. The radio frequency components, such as a transmission oscillator with an upper harmonic mixer 29 and a governor 27 for the oscillator power and frequency, a quad gate circulator 30, reception mixer 31, a U-shaped connecting waveguide 28, a 3 dB coupler 26, a phase corrector 25, a balance element 24, and two antennas 20, 21 oppositely directed on the longitudinal axis are disposed on the upper side of the plate.

The positioning of the radio frequency components occurs in two waveguide stages. The transmission oscillator with its governor 27 and mixer 29, quad gate circulator 30, and reception mixer 31 form the lower stage placed close to the printed circuit boards comprising previously described circuits 7 through 12 on the underside of the plate 4. The two antennas 20, 21 which are designed as an integrated waveguide radiator 22, together with the coupler 26, phase corrector 25 and balance element 24 form the upper stage. The two stages are connected by means of a U-shaped waveguide 28. The overall antenna at each respective side thus is formed by a radiator 22 and a corresponding lens 23. The beam direction can be set by means of the antennas 20, 21 disposed so as to be rotatable in an axial direction.

Directional setting or adjusting of each antenna occurs in the housing on the basis of a visual scale 37 over a maximum range of ±25° with respect to the center axis. Locking occurs by means of tightening two screws which slide in a long hole 35.

The position of the coupler close to the two antennas reduces power dissipation. The antennas 20, 21, of course, are transmit-receive antennas for both directions.

The phase corrector 25 lies between one antenna and the coupler, and serves the purpose of preventing nulls in the reception and transmission by the two antennas.

Figure 3:
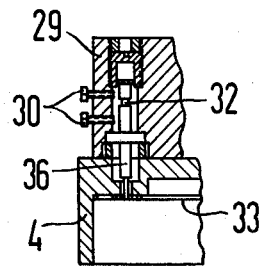
FIG. 3 shows in cross-section a portion of the transmission oscillator housing.

The transmission oscillator 29 with a tuning block 29a for temperature compensation is integrated with an upper harmonic mixer. Its screwed-down position on the upper chassis part 4 of the chassis makes possible a shortest spacing between the reception mixer diode 31 and transmission diode 32 (FIG. 3) which must supply a very small component of its power to the reception mixer diode 31. Also, the shortest coax connection 36 between the upper harmonic mixer diode and the multiplier circuit board may be employed through the floor of the housing.

Optimum heat dissipation from the transmission diode to the upper part of the housing exists in this invention with aluminum as a good thermal conductor.

The control of the transmission oscillator (energy and frequency) is carried out by a housing 27 directly screwed to the oscillator 29 and its tuning block 29a, said housing 27 having an internally-disposed printed circuit board. The mechanical connection occurs via a very small surface as a heat accumulator for the heat dissipation of the controller, but nevertheless high-frequency-tight and with the necessary shortest possible electrical line length between the controller and oscillator diodes. The thermal dissipation of the oscillator controller occurs at some distance from the oscillator directly onto the large circuit board housing of the upper chassis part 4 of the inserted chassis.

A quad gate circulator 30 directly follows the transmission oscillator 29, which in turn is followed by the reception mixer diode 31 and the U-waveguide 28. This component connection permits the smallest space exploitation given easy assembly and disassembly. The tuning elements, for example, 29a for the transmission oscillator with upper harmonic mixer 29, the transmission oscillator itself, and the reception mixer 31 accordingly remain freely accessible.

Test connections 38 at the narrow sides of the two inserted chassis parts 3, 4 allow a checking of all printed circuit boards situated in the device as to their functionability.

Radio frequencies may be set in a freely accessible manner from the upper side of the insert chassis part 4 by means of switching modules soldered onto the side of the synthesizer 12, and are operated through a closable opening of the floor of the chassis part 4.

The overall power supply and signal transmission of the radio link device occurs via a multi-pole, watertight weather-proof plug 15 whose position in the narrow side of the bottom trough makes an easy plug-type connection possible.

Seating of the radio link device occurs via four rubber-metal connections 39 screwed to the lower side of the floor trough via four cast-on pedestals.

The transmission oscillator (see FIG. 4) serves for generating the transmission power of the radio transmission device in the 30 GHz range. The device may be stationary or mobile. The upper harmonic mixer is required for transmission frequency supervision and control. It generates upper harmonics of a constant comparative frequency and conducts the differential frequency between a specific upper harmonic and the transmission frequency to a governor 27 (shown in FIG. 2) external to the oscillator which regulates the transmission frequency of the power diode 43 via a tuning diode 42. The following advantages derive as a result of the integration of the mixer into the oscillator housing 41, 45:

1. Cost saving due to the elimination of a mixer housing.
2. Accommodation of the mixer diode 44 in the direct proximity of the power diode 43 which must supply a specific power to the mixer diode 44, i.e., the smallest possible power losses as a result of a short line length.
3. Simple coupling via an iris.
4. High-frequency effective transition between mixer diode 44 and multiplier 7 in the printed circuit board housing 46 without any expense whatsoever, since the transmission oscillator must be screwed to the printed circuit board housing 46 for thermal reasons.
5. Better space exploitation of the radio frequency components with a resulting reduction in size of the overall device.

Figure 4:
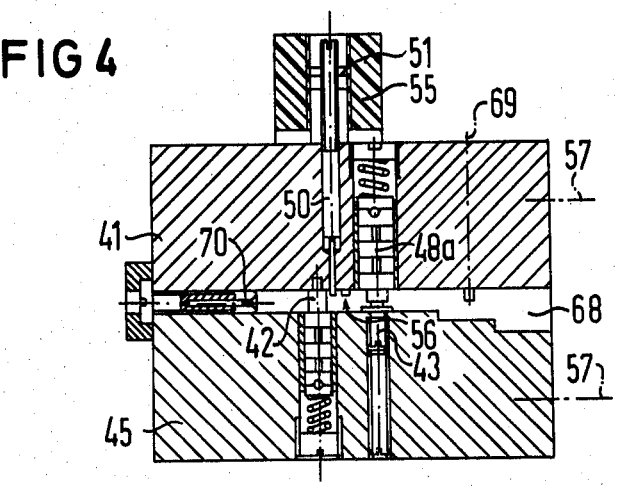
FIG. 4 shows in cross-section the transmission oscillator.
Figure 5:
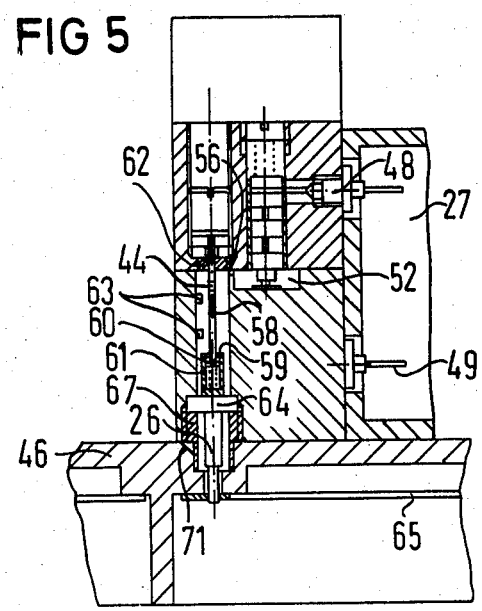
FIG. 5 is a cross-sectional view at right angles to the view according to FIG. 4.

As shown in FIGS. 4, 5, a horizontally divided block is provided forming an upper part 41 and lower part 45. Milled portions are provided in the lower part for a waveguide 52.

Due to the division of the oscillator housing 41 along the cover of the waveguide 52, one achieves the possibility, given the close placement of the three diodes 42, 43, 44 with respect to one another, of soldering the power diode 43 in the waveguide floor in the lower part of the housing 45. In addition to optimum oscillator quality, the power dissipation heat is dissipated into the solid lower part 45 of the housing without a thermal transmission accumulation and is further dissipated via a large thermal contact surface into the printed circuit board housing 46 employed as a cooling body. The high-frequency shielded power supply 48 coupling to the diode 43 is provided in coaxial fashion via a band stop filter 48a with an adaptor in the upper part 41 of the housing. The contact pressure between the adaptor and the diode 43 can be controlled and is constant over the entire use temperature and mechanical oscillation range. By means of the lateral arrangement of the current supply output 48, one obtains a very short, high-frequency shielded current path which is insensitive to disruption.

As illustrated in FIG. 4, the second diode 42 in the waveguide, i.e., the tuning diode 42 for the oscillator, is spaced from the power diode 43 with the distance of the transmission frequency wave λ. The waveguide 52 itself is terminated at its end with a short-circuit plunger or slide element 70. The electrically optimum lateral offset to the center of the waveguide was experimentally determined. The contact pressure can be likewise regulated (by means of a screw via a band pass filter) as in the power diode 43. By means of incorporating the power supply 49 for the tuning diode in the lower part 45 of the housing, the small diode spacings can be executed without difficulty.

The mechanical frequency setting is provided at a distance λ/4 from the tuning diode 42 since a metallic pin 50 is lowered from the upper part of the housing into the waveguide 52 by means of a fine threaded bore in the bearing 51 of the adjustment pin 50. The necessary metallic ground contact 53 (FIG. 6) with approximately 1 Newton pressure between pin 50 and waveguide cover 54 is ideally achieved by means of spring force of the longitudinally slotted pin 50, so that this is electrically shielded and cannot form a coaxial resonator as in the case of a ground contacting which lies lower. In addition, as a result of the broad thermal range of use, the frequency tuning pin 50 must be seated in a temperature-compensating manner. That is securely achieved by means of an adjustable seating in a solid U-shaped plastic block 55 which is rigidly screwed to the upper part of the housing.

Figure 6:
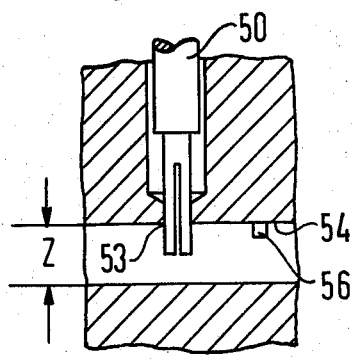
FIG. 6 illustrates in greater detail a portion of FIG. 4.
Figure 7:
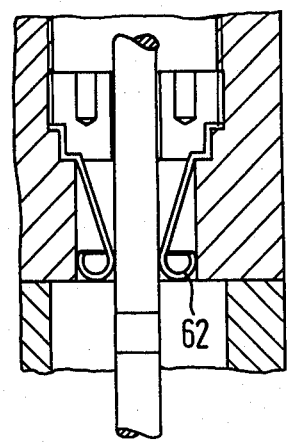
FIG. 7 illustrates in greater detail a portion of FIG. 5.
Figure 8:
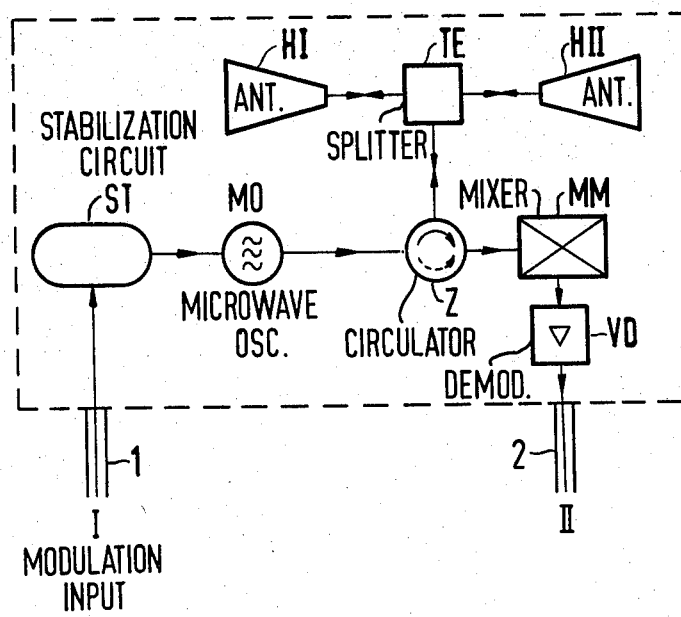
FIG. 8 is a block diagram of a prior art radio transmission-receiver.

The mixer diode 44 is coaxially built in the direct proximity of and laterally offset with respect to the power diode 43. Its position is changed in an axially displaceable manner with respect to the waveguide iris 56 (a minute milled passage) between the coaxial outer conductor and the wall of the waveguide. This is achieved by shortening or lengthening the coaxial line 58 as desired over a specific range via a radially wiping spring contact 59. As shown in FIG. 6, the contact pressure between the coaxial line adapter 60 and the diode 44 is kept largely constant by means of a compression spring 61 built into the line. The ground connection of the diode 44 is provided in optimal fashion in the upper part 41 of the housing via a spring element 62 (FIG. 7) which provides an extremely short current path between the diode 44 and the outer conductor, and also provides a high grounding contact pressure via a large plurality of contact points. Additional tuning elements 63 can be very simply introduced into the outer conductor of the mixer since the mixer (FIG. 5) proceeds parallel to the outside of the housing. The tuning itself is likewise very easy to manipulate due to free access to the tuning element 63. The coaxial line 58 is radially and axially seated by a coaxial support disk 64 which absorbs the forces which arise. The connection between the coaxial line 58 and the printed circuit board 65 is kept very short via a coaxial transition 66 since the floor of the printed circuit board housing 46 is designed as an outer conductor. The necessary, defined ground contact of the outer conductor between the oscillator housing 45 and the printed circuit board housing 46 is achieved by means of an annular spring element 67 (FIG. 5) which at the same time centers the radio frequency oscillator in a precise position with respect to the printed circuit board housing 46 via a taper 71.

The waveguide 52 is easy to provide with a good conductive surface due to the housing separation. The waveguide 52 leads to the following RF components via a transformation 68 which is tunable by means of pin 69. The connection is provided via a standardized waveguide thread bore frame 57.

Although various minor modifications may be suggested by those versed in the art, it should be understood that we wish to embody within the scope of the patent warranted hereon, all such embodiments as reasonably and properly come within the scope of our contribution to the art.

We claim as our invention:

1. A device and housing system for radio transmission and reception, comprising: a housing formed of upper and lower oval half shell housing parts connected to one another via a tight flange, the upper shell being designed as a cover of synthetic material and the lower shell comprising a metal injection molding connected in water-tight fashion with the upper shell via an inserted seal; a radio transmission and reception unit constructed on upper and lower chassis parts hingeably connected to one another and inserted in the housing; the lower chassis part having a first plug member electrically connected to a second plug member in the lower housing part, said second plug member in turn being connected with a weather-proof plug in the lower housing part for external connections; the upper chassis part carrying oppositely disposed radio frequency antennas on its upper side in a direction of a principal axis, each antenna comprising a rigidly disposed waveguide radiator and a rotatably secured lens means for beam adjustment electrically effective and arranged in front of said wave guide radiator; and the two waveguide radiators being connected via balance elements, phase correctors, directional couplers, and phasing lines in waveguide technology and rigidly disposed on the upper chassis part.

2. A system according to claim 1 wherein the lower chassis part is designed with oppositely facing troughs and contains a printed circuit board in the trough open toward a bottom of the lower half shell and the trough open toward the top accepts a demodulator printed circuit board, and connection lines between the two circuit boards are guided through a floor between the troughs.

3. A system according to claim 1 wherein the upper chassis part is designed trough-shaped toward a bottom thereof and contains printed circuit boards for an IF amplifier, a gain controlling amplifier, a frequency multiplier, a radio frequency amplifier, a preliminary filter, and a frequency synthesizer.

4. A system according to claim 1 wherein the upper half shell contains a sun screen and is bonded at its lower edge to a circumferential metal ring which has a sealing ring in a groove for mutually sealing the two half shells.

5. A system according to claim 1 wherein a transmission oscillator and reception mixer are connected to one another via a circulator and these parts carrying radio frequencies and positioned on the upper chassis part are directly connected by means of electrical connections which pass through the upper chassis part to parts carrying lower frequencies on a bottom side of the upper chassis part.

6. A system according to claim 1 in which components of the transmission and reception unit disposed on the upper chassis part include a horizontally divided block forming an upper part and lower part in which a milled portion is disposed in the lower part for a waveguide for the supply and tapping of radio frequency energy such that the upper part forms a broad side cover of the waveguide and a power diode for the transmission energy generation is seated in the waveguide along with a tuning diode seated offset in a direction toward an end of the waveguide; first bore means with filter elements and insulating elements for supply of signal voltage to the power diode in the upper part; second bore means similar to the first bore means for supplying voltages for the tuning diode via the lower part; and a mixer diode seated in a third bore in the lower part which is offset somewhat with respect to the waveguide, said mixer diode being supplied with high frequency via an iris in the waveguide and being coaxially held and seated from the top and the bottom, a continuation of the coaxial support toward the bottom serving for tapping of an intermediate frequency signal.

7. A system according to claim 6 wherein the signal voltage to the power diode as well as the supply voltages to the tuning diode are provided via lateral bores perpendicular to an axis of the waveguide and to axes of a band pass filter, and said bores passing into a housing of a control means.

8. A system according to claim 6 wherein in a direction along a longitudinal axis of the waveguide, a tuning pin means for additional rough frequency adjustment is seated in a bore in the upper part next to the tuning diode between the tuning diode and the power diode, said pin being seated at a top in a synthetic part in a frequency-compensated manner.

9. A device and housing system for radio transmission and reception, comprising: a housing formed of upper and lower oval half shell housing parts connected to one another, the upper half shell housing part being comprised of an insulating material and the lower half shell housing part being comprised of metal; upper and lower chassis parts hingeably connected to one another received in the housing; the upper chassis part carrying radio frequency antennas comprising waveguide radiators; and the waveguide radiators being connected to waveguide transmission lines connecting with waveguide frequency transmission and reception components on the upper chassis part; and the lower chassis part containing a demodulator circuit board and a power supply circuit board.

* * * * *